(12) United States Patent
Taijeron

(10) Patent No.: US 9,193,076 B2
(45) Date of Patent: Nov. 24, 2015

(54) DIGITAL LEVEL AND LASER CLIPPER LINER KIT

(71) Applicant: Christian Taijeron, Oakland, CA (US)

(72) Inventor: Christian Taijeron, Oakland, CA (US)

( * ) Notice: Subject to any disclaimer, the term of this patent is extended or adjusted under 35 U.S.C. 154(b) by 84 days.

(21) Appl. No.: 14/258,025

(22) Filed: Apr. 22, 2014

(65) Prior Publication Data
US 2015/0298325 A1 Oct. 22, 2015

(51) Int. Cl.
*B26B 19/38* (2006.01)
*G01C 9/06* (2006.01)

(52) U.S. Cl.
CPC ......... *B26B 19/3826* (2013.01); *B26B 19/3813* (2013.01); *G01C 9/06* (2013.01)

(58) Field of Classification Search
CPC ........... B25B 19/3813; B25B 19/3826; G01C 15/004
USPC ............................. 33/276, 281, 282, 285, 286
See application file for complete search history.

(56) References Cited

U.S. PATENT DOCUMENTS

| | | | | |
|---|---|---|---|---|
| 5,588,216 A * | 12/1996 | Rank | ...................... | G01B 11/27 33/286 |
| 5,829,147 A * | 11/1998 | Kousek | ................ | G01C 15/004 33/293 |
| 6,163,969 A * | 12/2000 | Jan | ........................ | G01C 15/008 33/282 |
| 2004/0221462 A1* | 11/2004 | Liao | ..................... | G01C 15/008 33/286 |
| 2015/0000144 A1* | 1/2015 | Yuen | ....................... | G01B 7/30 33/228 |
| 2015/0040934 A1* | 2/2015 | Krenik | .................. | A45D 24/36 132/200 |

* cited by examiner

Primary Examiner — G. Bradley Bennett
(74) Attorney, Agent, or Firm — Aroplex Law

(57) ABSTRACT

The new digital level and laser clipper liner kit is concerned with providing a means for measuring and cutting hairlines, beards and mustaches in straight lines or at a desired angel with precision. Existing level-type devices for hair care are generally useful for a single hair maintenance task, whereas the new digital level and laser clipper kit provides a means for accurately performing all traditional haircutting tasks. The digital level and laser clipper liner kit contains: a digital level clipper liner, a front laser level tool, a side laser level tool, and skin-safe marking pens.

4 Claims, 4 Drawing Sheets

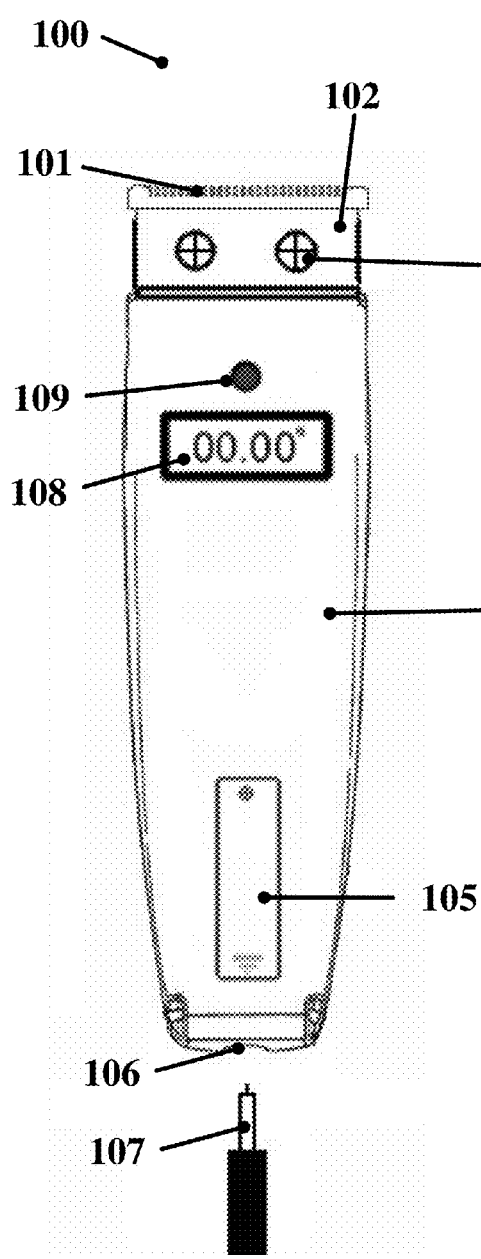
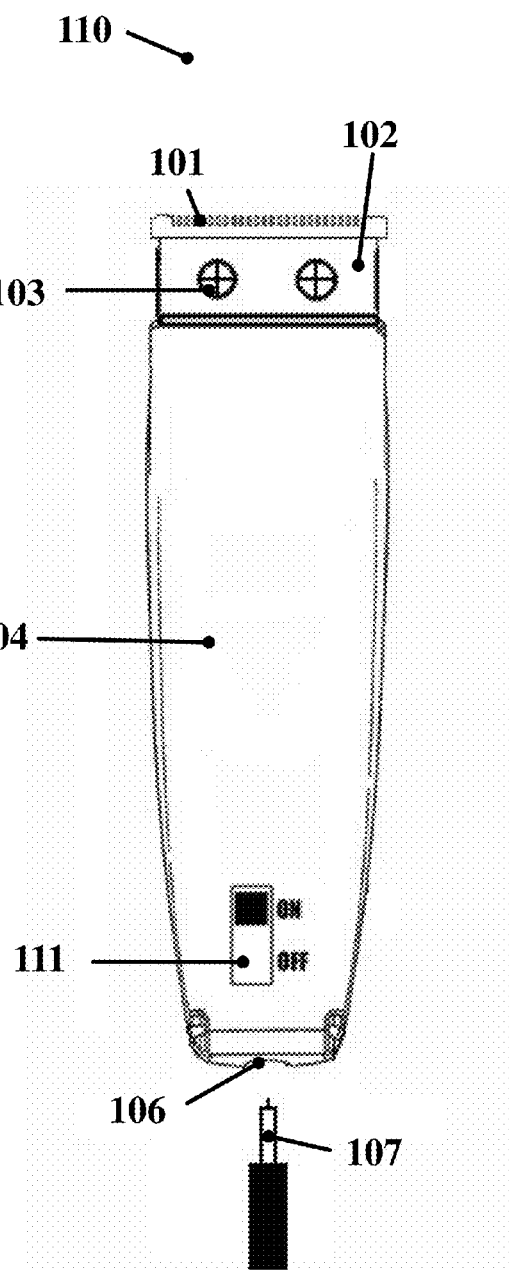

DIGITAL LEVEL AND LASER CLIPPER LINER KIT

CROSS-REFERENCE TO RELATED APPLICATIONS

None.

FEDERALLY-SPONSORED RESEARCH

None.

SEQUENCE LISTING

None.

BACKGROUND OF THE INVENTION

The new digital level and laser clipper liner kit is concerned with providing a means for measuring and cutting hairlines, beards and mustaches in straight lines or at a desired angel with precision. It is known that the accuracy of current industry clippers is dependent on the user to determine angles and straight lines while trimming various hair lines and matching up two sides at exact angles (i.e. side burns, beards, mustaches, hairlines). It is also known that clippers are sold and operated by individuals as well as professionals. However, it has not been possible heretofore for hair care professionals or personal users to guarantee exact angles and cut straight lines with certainty, nor has their been in an industry-friendly tool specifically allowing for these types of measurements or this degree of accuracy.

Level devices have been introduced to the market for use on hair clippers or shavers—such as those disclosed in U.S. patent application publications 2008/0222906 A1, 2008/0060667 A1 and 2004/0139615 A1—as well as for use on one's finger during the hair cutting process—such as that disclosed in U.S. Pat. No. 8,056,248 B2. Each such device is generally useful for a single hair maintenance task, whereas the new digital level and laser clipper kit provides a means for accurately performing all traditional haircutting tasks.

SUMMARY OF THE INVENTION

Generally, this application relates to two tools attached, or that can be attached, to a set of hair trimming clippers, ensuring grooming accuracy in a more timely and efficient manner than previously possible. The digital level and laser clipper liner kit contains: a digital level clipper liner, a front laser level tool, a side laser level tool, and skin-safe marking pens. The laser level tools project a laser line that allows the operator to see and cut in a straight line, or cut at a desired angle, as reported by the digital degree display. That degree can be duplicated, with accuracy, on the other side of the head, mustache or beard, by rotating the clippers until they have reached the appropriate angle, indicated by digital degree window.

The other laser level tool is used specifically for measuring a desired area for grooming/cutting and making the perfect hairline. The tool is set at the hairline. Once turned on, a laser line comes out of both sides of the tool to set the rest of the hairline. Using a specialty marker designed for use on skin, the operator can mark the points of desired hair removal and then cut precisely by using the other tool to project a line from one marked point to the other.

The sum of these advantages unify with the novel article of the new clipper kit, resulting in an invention that is not anticipated, rendered obvious, suggested, or even implied by any of the prior art support, either alone or in any combination thereof.

These, together with other objects of the invention, along with the various features of novelty characterizing the invention, are described with particularity in the claims herewith. A more comprehensive understanding of the features, operation and uses of the invention may be gleaned from reference to the enclosed drawings and descriptive matter further illustrating the preferred embodiments of the invention.

The embodiments described herein are illustrative of the invention, and it is to be understood that the invention is not limited in its application to the details of construction and to the arrangements of the components set forth in the following description and drawings. The invention is capable of other embodiments and of being practiced and carried out in various ways. It should be further understood that the phraseology and terminology applied herein merely serve the purpose of description and should not be regarded as limiting.

BRIEF DESCRIPTION OF THE DRAWING(S)

FIGS. 1A and 1B depict the front and back of one embodiment of the digital level clipper liner.

Figure 4A:
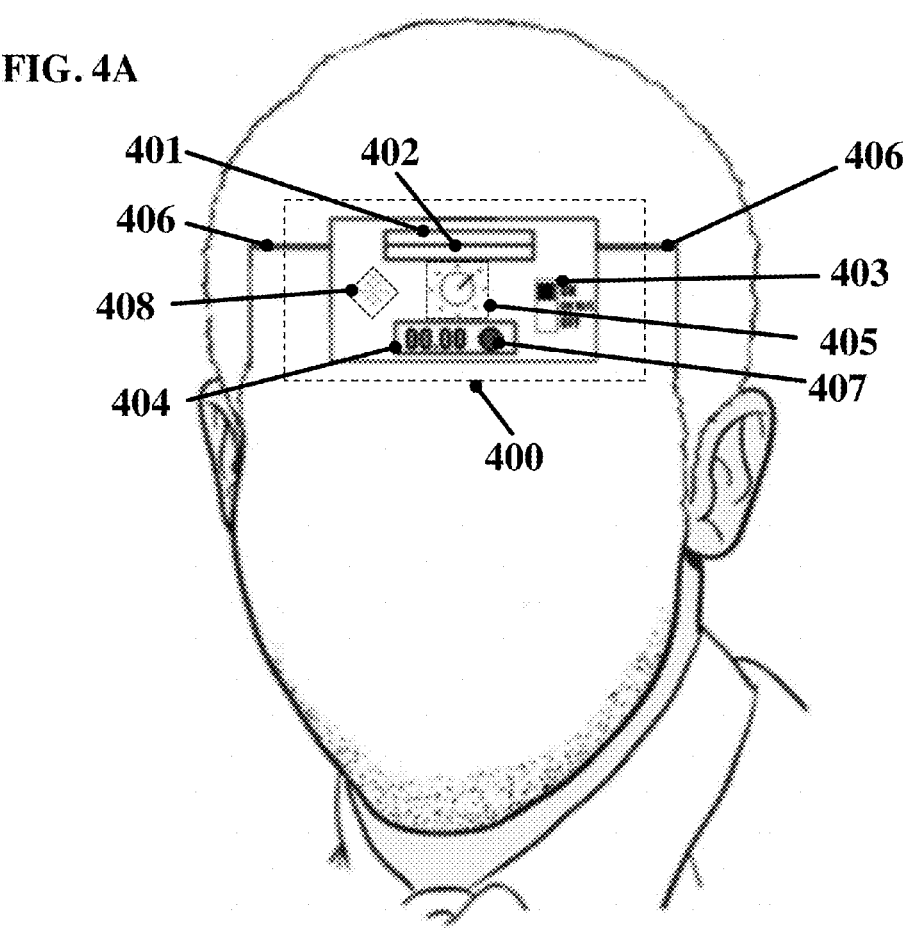
Figure 4B:
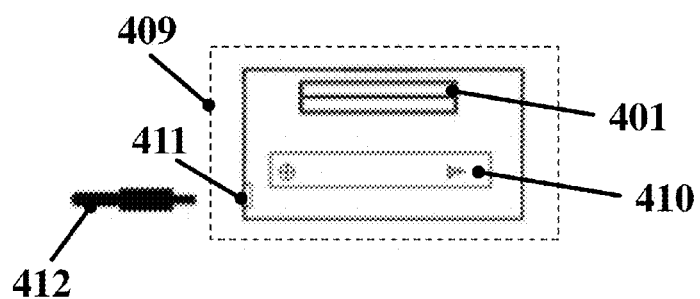

FIGS. 4A and 4B collectively illustrate the front and back of one embodiment of the side laser level tool.

DETAILED DESCRIPTION OF THE DRAWINGS

In accordance with this invention, it is now possible for hair stylist/barbers to guarantee straight lines and create exact matching hair line angles on both sides of head and face. By using the digital level clipper liner or attaching laser level tools to the hair clippers, a user can project straight lines onto a subject's head or hair by a laser guiding a straight cut. A digital degree window ensures a level cut or an exact desired angle. The laser level tool and markers allow user to create with precision the desired hairline. Further, the new system enables individual use of hair clippers to achieve the same professional outcomes. Both laser level tools are equipped with a red light that indicates when laser line is level or when desired angle has been reached. This allows the individual user, who may have trouble reading the digital degree window in the mirror, to trim hair with precision and ease. The following is submitted to illustrate but not to limit this invention.

FIGS. 1A and 1B collectively illustrate one embodiment of the digital level clipper liner component 100 of the new clipper kit. FIG. 1A shows the front side of the digital level clipper liner 100. The primary hair-cutting component of the new level liner is the clipper blade 101, which is set partially inside a clipper blade housing 102 and held securely to said housing via a securing means, such as a screw 103. The housing 102 is attached to the clipper body 104. The body contains power functionality, such as replaceable and/or rechargeable batteries. The depiction of the instant embodiment shows a cover 105, behind which one or more batteries can be stored, and a port 106 to accommodate an external power source 107. The body 104 further accommodates a digital level and display 108 to facilitate straight cutting. In the current embodiment, a red LED light 109 turns on when the clippers are held at a level angle (i.e., 00.00°). FIG. 1B shows the backside digital level clipper liner 110 in operational mode, having the power switch 111 in 'ON' position.

Figure 2:
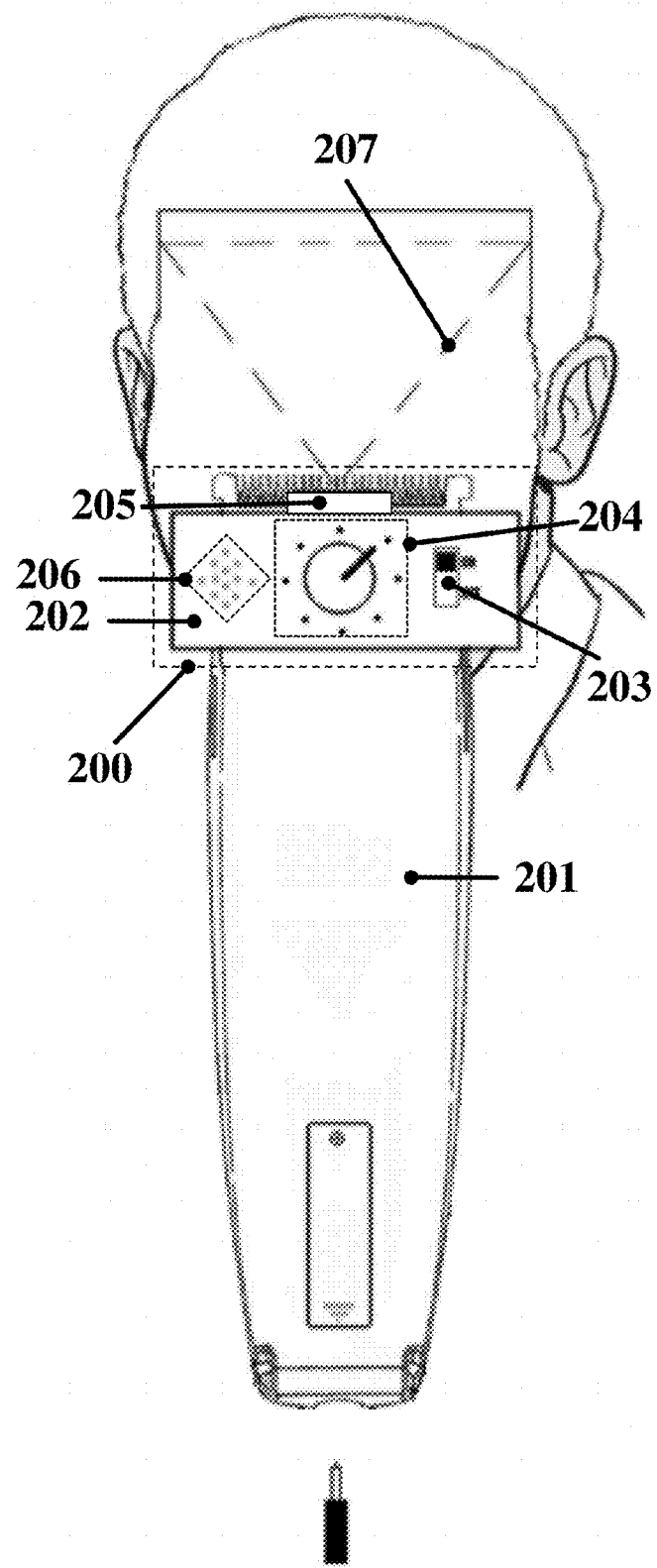
FIG. 2 depicts one embodiment of the front laser level tool.

FIG. 2 illustrates one embodiment of the front laser level tool component 200 of the new clipper kit as attached to a set of clippers 201. The front laser level tool 200 consists of a main body piece 202, a power switch 203, a laser angle dial 204, a laser 205 and an audio or visual indicator 206. In the depicted embodiment, the indicator 206 is a speaker. In use, the user sets the dial 204 to the desired cutting angle based on the subject's natural or desired hairline, and the laser 205 shines on the subject's head 207. The user can then mark, with skin-safe marking pens included in the new clipper kit, boundary points or the full line to follow when cutting. The indicator 206—either a light or speaker or both—activates when the clippers 201 and, thus, the laser 205, are held at a level degree to ensure accurate marking. Additionally or alternatively, the new front laser level tool 200 can be used as a digital level attachment. In the instant embodiment, the laser level tool would facilitate clipping by making a noise or lighting up when the clippers are held level.

Figure 3A:
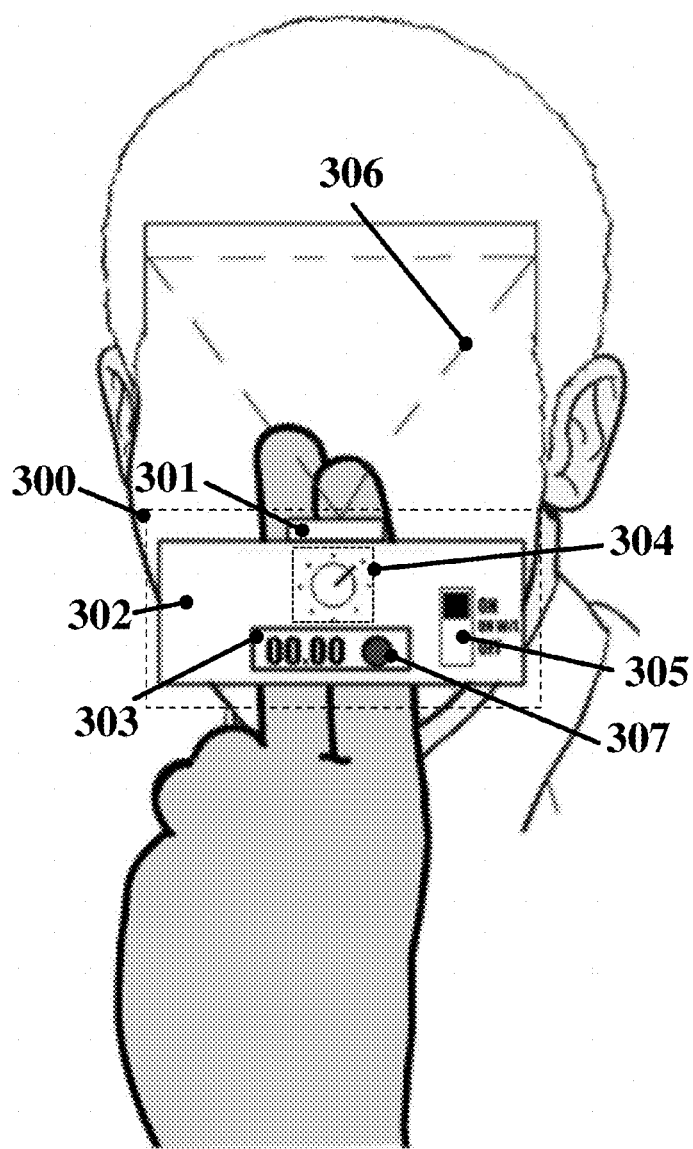
FIGS. 3A and 3B depict the front and back of another embodiment of the front laser level tool.
Figure 3B:
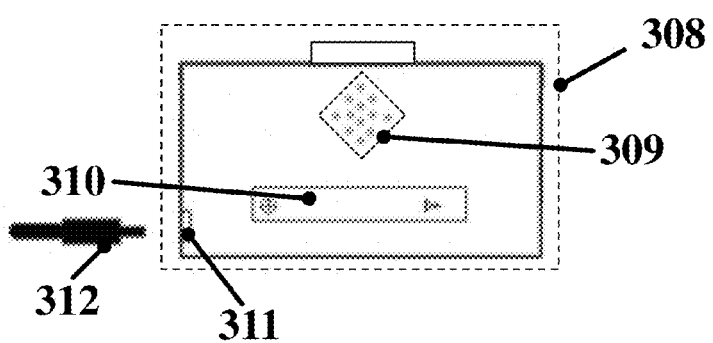

FIGS. 3A and 3B collectively illustrate another embodiment of the front laser level tool component 300 of the new clipper kit designed for independent use—i.e., not attached to a pair of clippers—in measuring and marking the boundaries or otherwise setting guide points for desired grooming or hair styling before initiating trimming or cutting. A marking pen specifically designed for temporary use on skin can be used in conjunction with the laser level tool to mark the skin. FIG. 3A shows the front side of the front laser level tool 300 having a laser 301 attached to the top of the tool's body 302, a level and digital display 303, a dial 304 for setting the desired cutting angle based on the subject's natural or desired hairline. The depicted embodiment further accommodates a power switch 305 and an indicator 307, which either makes a noise or lights up when the tool is held level. In this embodiment, the indicator 307 is an LED light. In operation, the user sets the dial 304 to the desired cutting angle based on the subject's natural or desired hairline, and the laser 301 shines on the subject's head 306. The user can then mark, with skin-safe marking pens included in the new clipper kit, boundary points or the full line to follow when cutting. The indicator 307—either a light or speaker or both—activates when the tool and, thus, the laser 205, are held at a level degree to ensure accurate marking. FIG. 3B shows the backside of the front laser level tool 308 having a second indicator 309, which is a speaker, a cover 310 behind which the body can accommodate rechargeable and/or replaceable batteries and a port 311 to accommodate an external power source 312.

FIGS. 4A and 4B collectively illustrate one embodiment of the side laser level tool component 400 of the new clipper kit designed for independent use in measuring and marking the boundaries or otherwise setting guide points for desired grooming or hair style before initiating trimming or cutting. As opposed to the front laser level tool component, the side laser level tool 400 enables proper hairline marking via lasers 406 directed horizontally from each side of the tool. In use, the user turns the power switch 403 to 'ON', holds the tool up to a subject's hairline so the user can view the hairline through the tool's alignment window 401 and aligns the tool using the horizontal line spanning the alignment window 402. A digital level and display 404 facilitate alignment by informing the user of the horizontal angle of the tool, and an indicator, which can be either a light 407 or speaker 408 or both, alerts the user when the tool is perfectly level. The user can then adjust the side lasers 406 using the dial 405 so that the lasers can be used to mark the desired hairline. A marking pen specifically designed for temporary use on skin can be used in conjunction with the side laser level tool to mark the skin. FIG. 4B shows the backside of the side laser level tool 409 having a cover 410, behind which the body can accommodate rechargeable and/or replaceable batteries, and a port 411 to accommodate an external power source 412.

As to further discussion of the manner of usage and operation of the present invention, the same should be apparent from the above description. With respect to the above description then, it is to be realized that the optimum dimensional relationships for the parts of this invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention, the use of which results in a digital level and laser clipper liner kit that enables barbers and individuals to cut hair in straight lines and create exact matching hair line angles on both sides of head and face.

Although the description presented heretofore contains specificities for the benefit of illustration, these should not be construed as limiting the scope of the embodiments but rather as illustrative examples of some of the several embodiments. Thus, the scope of the embodiments should be determined by the appended claims and their legal equivalents rather than by the examples provided.

The invention claimed is:

1. A digital level and laser clipper liner kit for measuring and cutting hairlines, beards and mustaches in straight lines or at a desired angel with precision, comprising:
    a pair of clipper liners with a digital level and angle indicator means;
    a front laser level tool that can be attached to a pair of barber liners or used freely to mark a desired area for grooming or cutting hair, having a substantially rectangular body piece with two sides and a top and a bottom, a power source, an operational control, such as a switch, an adjustable triangulating laser beam that emits from a laser beam emission point located on the top of said body piece, a dial for adjusting the angle of said laser beam, a level and an angle indicator means;
    a side laser level tool for measuring a desired area of hair for grooming or cutting wherein said side laser level tool has a substantially rectangular body piece with two sides and a top and a bottom, a power source, an operational control, such as a switch, bilateral adjustable laser beams that emit from laser beam emission points located on the two sides of said body piece, an alignment window that enables partial viewing through the body piece, said alignment window further comprising an alignment means positioned on said body piece such that the alignment means and laser beams emission points are essentially laterally identical, a dial for adjusting the angle of the laser beams, a level and an angle indicator means;
    one or more marking pens for use in conjunction with said first or second laser level tool to set and mark the boundaries or other guidelines points to facilitate accurate hair grooming or cutting.

2. The digital level and laser clipper liner kit of claim 1 wherein the angle indicator means of the clipper liners is one or more of the group comprising: a digital display, a binary audio indicator such as a speaker, and a binary visual indicator such as an LED light.

3. The digital level and laser clipper liner kit of claim 1 wherein the angle indicator means of the front laser level tool is one or more of the group comprising: a digital display, a binary audio indicator such as a speaker, and a binary visual indicator such as an LED light.

4. The digital level and laser clipper liner kit of claim 1 wherein the angle indicator means of the side laser level tool is one or more of the group comprising: a digital display, a binary audio indicator such as a speaker, and a binary visual indicator such as an LED light.

\* \* \* \* \*